May 13, 1941. E. ELIASON 2,241,636
WATER LEVEL CONTROLLER
Filed April 18, 1940
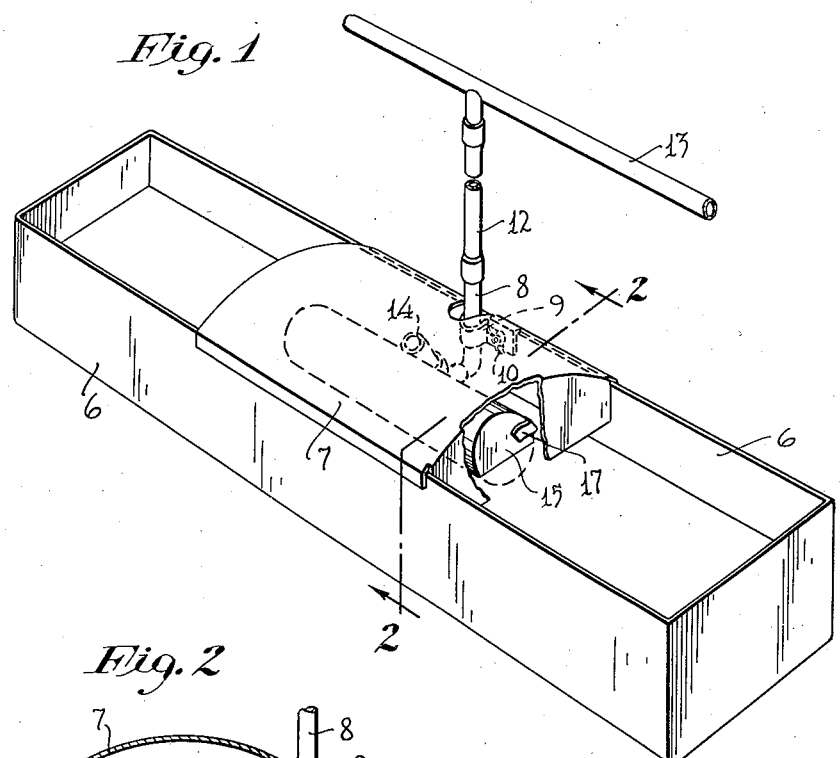
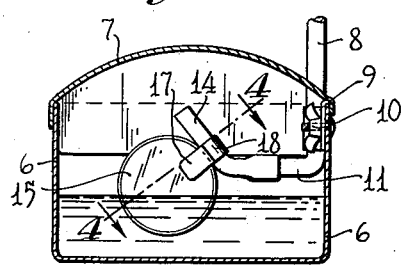
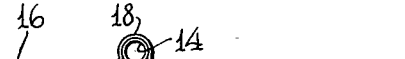
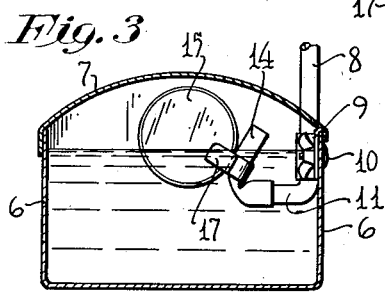
Inventor
Elmer Eliason
By his Attorneys
Merchant & Merchant Patented May 13, 1941

2,241,636

UNITED STATES PATENT OFFICE 2,241,636

WATER LEVEL CONTROLLER

Elmer Eliason, Brookpark, Minn.

Application April 18, 1940, Serial No. 330,305

1 Claim. (Cl. 137—104)

My present invention provides an extremely simple and highly efficient water level controller for drinking troughs, tanks, or similar receptacles; and generally stated consists of the novel devices, combination of devices, and arrangement of parts hereinafter described and defined in the claim.

The controller is in the nature of a valveless device and effects the opening and closing of a flexible and collapsible discharge tube by kinking the same to stop the flow and releasing the same to permit the flow. I have found that a rubber tube can be thus effectively used for the above purpose providing the arrangement is such that the kinking action will be always repeated in the same way. Otherwise stated, if the tube be kinked by a movement that is always in the same plane, the flow will be entirely stopped; whereas if the tube is permitted to twist or partake of a torque action, there will be a leakage. My invention accomplishes the desired results by a novel and very efficient way hereinafter described in connection with the accompanying drawing, wherein like characters indicate like parts throughout the several views.

Referring to the drawing:

Fig. 1 is a view in perspective illustrating the invention as applied to a drinking trough or receptacle such as used for watering poultry or livestock;

Fig. 2 is a transverse vertical section taken approximately on the line 2—2 of Fig. 1 showing the device adjusted for the supply of water;

Fig. 3 is a view corresponding to Fig. 2, but showing the device adjusted to cut off the water supply; and Fig. 4 is a section taken through the float approximately on the line 4—4 of Fig. 2.

In the structure illustrated, the water tank 6 is shown as provided with a removable hood 7. The water is directly conveyed to the tank by a short metallic pipe 8 that extends vertically inside of the tank and is clamped to that side of the tank by a yoke-like bracket 9, which in turn is clamped to the tank by nut equipped bolts 10. This rigid metallic pipe 8 has a horizontally bent or extended discharge end 11. The pipe 8 can receive water from any suitable source, but as shown is connected by a flexible hose 12 to a water supply pipe 13. This flexible tube 12 permits the pipe 8 to be vertically adjusted so as to definitely determine the different desired water levels desired within the tank.

The control acting member, which acts as a substitute for a valve, is a flexible and collapsible tube 14 preferably of rubber, that is telescoped on to the horizontally extended delivery end 11 of pipe 8.

The float for controlling kinking of the tube 14 is preferably a cylindrical air tight metallic can 15. It is, however, very important that this float 15 have a longitudinal length that is very much in excess of its diameter or width. Now it is also important that the free end of the collapsible tube 14 be attached to the intermediate or central portion of this float. This attachment may be made in different ways, but preferably as shown, and is accompanied by a spring acting metallic anchoring bar 16. This bar 16 has spring acting ends 17 that engage the ends of the float, and at its central portions said bar is formed with a loop 18 that frictionally but securely engages the free end of tube 14 and firmly but adjustably holds the tube to said tank.

To get the best buckling action of the tube 14, the float should be secured to the tube 14 quite close to the end of pipe terminal 11, so that said tube will be buckled to stop flow as best shown in Fig. 3.

When the water level is low, the float will vary thereby permitting tube 14 to straighten out for the flow of water therethrough. When the water level has reached the predetermined desired level, the float will kink the tube 14 as shown in Fig. 3 thereby stopping the flow.

Here it is important to note that because of the length of the float, and the projection thereof considerably on both sides of the vertical plane that includes the tube 14, said tube will always be raised and kinked in the said same plane. Otherwise stated, when the tube 14 in kinked or buckled, it will always be bent in the same plane, to wit; in the vertical plane that includes the axis of tube 14 and delivery end 11 of pipe 8.

As already indicated, the predetermined level of water to be maintained in the tank will be varied by vertical adjustments of the pipe 8; and when once adjusted that predetermined water level will be maintained. The hood 7 prevents water from being projected out of the trough or tank when the delivery end of tube 14 is turned upward, for example, as shown in Fig. 2.

As is evident, the elements of this device may be very quickly assembled or disassembled, or taken apart, for cleaning purposes. Of course, these parts, when disassembled can be packed in a small space.

What I claim is:

A float controlled device involving a flexible and collapsible delivery tube, a float that is of greater length than width, and a clamping bar detachably engageable with the ends of said float with its intermediate portion detachably connected to the delivery end of said tube.

ELMER ELIASON.